United States Patent [19]

Kubis et al.

[11] Patent Number: 4,936,943

[45] Date of Patent: Jun. 26, 1990

[54] QUICK DETACH ASSEMBLY FOR A SEALING HEAD

[75] Inventors: Charles S. Kubis, Palos Heights; John Walter, Evergreen Park, both of Ill.

[73] Assignee: Continental·Can Company, Inc., Norwalk, Conn.

[21] Appl. No.: 207,505

[22] Filed: Jun. 16, 1988

[51] Int. Cl.$^5$ .......................... B29C 65/32; B65B 31/00
[52] U.S. Cl. ......................................... 156/580; 53/97; 53/109; 53/368; 53/373; 53/511; 53/DIG. 2; 156/69; 156/380.6; 439/191; 439/378; 439/680
[58] Field of Search .................. 156/69, 273.7, 274.2, 156/274.4, 379.6, 379.7, 380.2, 380.6, 580, 583.1; 219/10.43, 10.53, 10.67, 10.73, 10.79; 53/88, 97, 109, 373, 510, 511, DIG. 2, 368; 439/190, 191, 198, 374, 378, 680, 681

[56] References Cited

U.S. PATENT DOCUMENTS

| | | | |
|---|---|---|---|
| 2,135,212 | 11/1938 | Kantor | 53/351 |
| 2,510,125 | 6/1950 | Meakin | 439/191 |
| 2,609,735 | 9/1952 | Farrell et al. | 53/375 |
| 2,820,495 | 1/1958 | Wetzler | 100/93 P |
| 3,248,851 | 5/1966 | Ford | 53/373 |
| 3,290,863 | 12/1966 | Geber | 53/360 |
| 3,684,619 | 8/1972 | Engler et al. | 156/379.7 |
| 4,003,186 | 1/1977 | Van Rede | 53/88 |
| 4,058,953 | 11/1977 | Sanborn et al. | 53/511 |
| 4,295,922 | 10/1981 | Evers | 53/373 |
| 4,707,213 | 11/1987 | Mohr et al. | 53/373 |
| 4,791,775 | 12/1988 | Rague et al. | 53/510 |

FOREIGN PATENT DOCUMENTS 2535139  2/1977  Fed. Rep. of Germany ... 156/583.1

Primary Examiner—Robert A. Dawson
Assistant Examiner—Steven D. Maki
Attorney, Agent, or Firm—Charles E. Brown; Paul Shapiro; Charles A. Brown

[57] ABSTRACT

This relates to the mounting of a sealing head for sealing a plastic lid in a plastic container by way of induction heating. In order that a sealing head may be readily removed and replaced by a like sealing head for cleaning and repair, there is provided a quick detachable coupling between the sealing head and a support which is carried by a movable positioner for vertically positioning the sealing head. Further, there is associated with the support a supply unit which supplies to the sealing head electrical energy for an induction heating coil and for a gas detector. In addition, there is supplied to the sealing head from the supply unit two separate vacuum supplies and an inert gas supply with one of the vacuum supplies serving to hold a lid in place on the underside of the sealing head and the other vacuum supply serving to evacuate the container prior to the lid being applied thereto. The inert gas supply is provided to supply an inert gas to an evacuated container prior to sealing.

4 Claims, 2 Drawing Sheets

QUICK DETACH ASSEMBLY FOR A SEALING HEAD

This invention relates in general to new and useful improvements in machines for sealing a plastic lid to a plastic container wherein the lid is clamped to the container in sealed relation and is bonded thereto by way of induction heating. The invention particularly relates to the mounting of the sealing head relative to a support and a supply unit for quick removal and replacement.

In accordance with this invention, there is provided a vertically movable support on which a sealing head is mounted. The sealing head is provided with a mounting member which includes a dovetailed portion which is secured to the support by way of quick releasable clamp bars and wherein there is a quick release stop member for engaging a front stop surface of the sealing head. By moving the stop member to an inoperative position, and loosening the clamp bars, the sealing head may be pulled forward out of engagement with the support. In order to facilitate this, the front part of the sealing head is provided with a suitable handle.

In accordance with this invention, there are certain electrical connections. First of all, there is an electrical connection for supplying electrical energy to an induction heating coil. The induction heating coil receives electrical energy from the supply unit by way of a plug and socket connection.

The sealing head also is provided with a gas detector of the electrical type and there is a second electrical connection between the sealing head and the supply unit of the plug and socket type.

In addition, the supply unit provides a vacuum supply for the sealing head. This vacuum supply may be of a two part arrangement, one part for suction cups for retaining a lid relative to the sealing head and the other part for drawing a vacuum within a container which is being sealed. Separate plug and socket connections are provided between the sealing head and the supply unit.

Further, the resultant package may incorporate an inert gas within it. To this end, the supply unit may also provide an inert gas supply which is coupled to the sealing head by way of another plug and socket connection.

It is to be understood that the supporting of the sealing head relative to the support is one wherein the plug and socket connections between the sealing head and the supply unit are automatically aligned so that when the sealing head is replaced, as the dovetailed portion of the mounting member is slid relative to the clamp bars of the support, the plugs will automatically be aligned with the sockets.

In accordance with this invention, the support for the sealing head is carried by a base for vertical movement. Also, the supply unit is carried by the same base for relative vertical movement. The support and the supply unit are coupled together for movement in unison. Suitable control means are provided for effecting vertical movement of the support.

Other advantages and characteristics of the invention will appear from a reading of the following description, given purely by way of illustration and example, with reference to the accompanying drawings, in which:

FIG. 4 is an enlarged fragmentary vertical sectional view taken generally along the line 4—4 of FIG. 2 and shows specifically the arrangement of vacuum and gas supplies and associated sockets of the supply unit.

FIG. 5 is an enlarged fragmentary sectional view taken generally along the line 5—5 of FIG. 2 and shows the details of the electrical connections of the supply unit.

Figure 1:
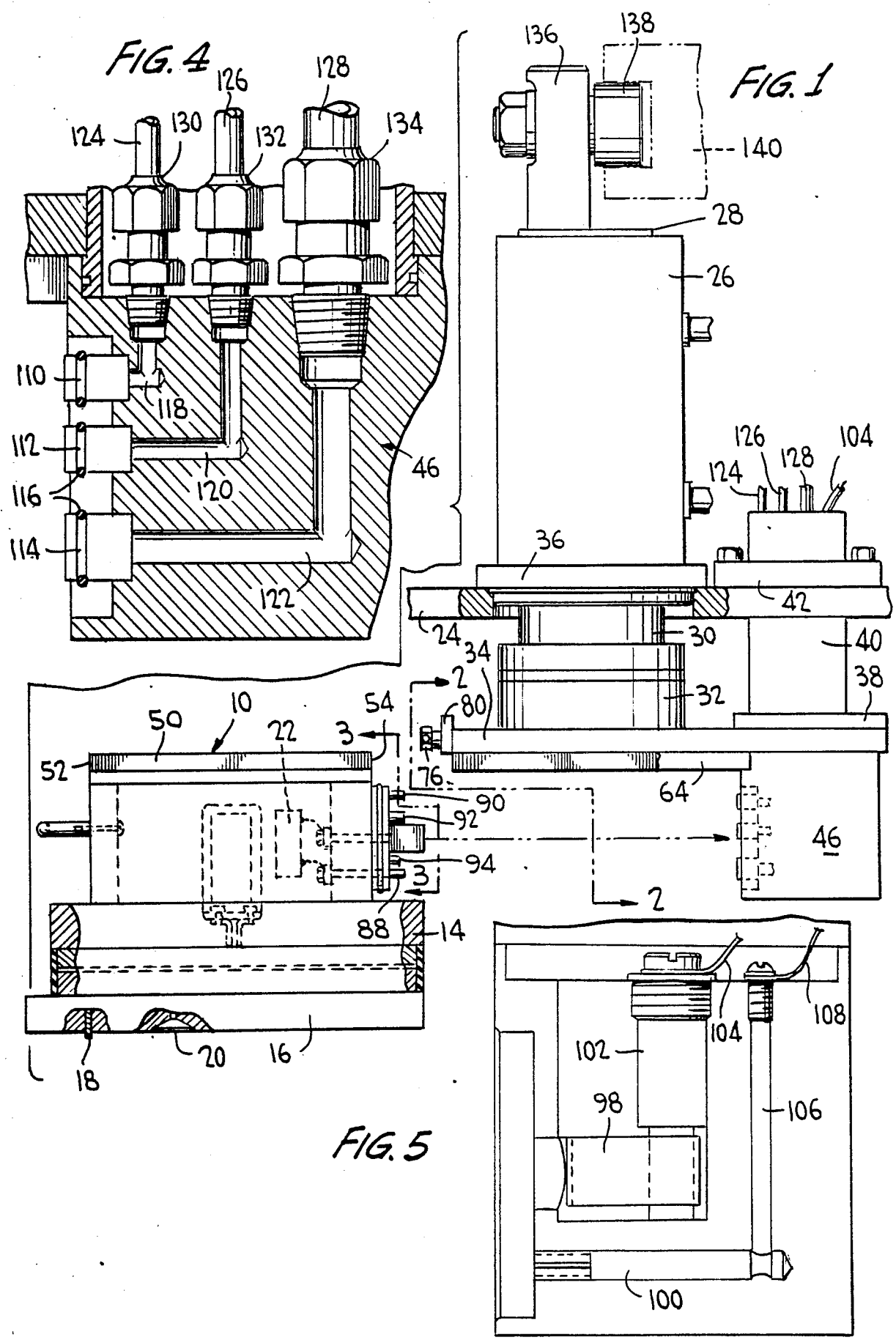
FIG. 1 is an exploded elevational view of the sealing head, the support therefor and the associated supply unit.

Referring now to the drawings in detail, it will be seen that there is illustrated in FIG. 1 a sealing head formed in accordance with this invention and generally identified by the numeral 10. The sealing head 10 includes an upper part 12 which has secured to the underside thereof a larger lower part 14. The lower part 14, in turn, carries a base member 16. It is to be understood that the base member 16 has incorporated therein an induction heating coil 18 and is provided with a set of suction cups 20 which serve to hold to the underside of the base member 16 a container lid (not shown).

The base member 16 may also carry means (not shown) for drawing a vacuum within a container which is to be sealed and thereafter for filling such container with an inert gas. In addition, the sealing head 10 will be provided with suitable monitor means 22 for detecting the presence and strength of the inert gas.

In FIG. 1 there is illustrated a base member 24 which in actuality is a plate mounted for rotation. The sealing machine of which the base member 24 is a part will carry a plurality of the sealing heads 10 although only one has been illustrated. The base member 24 has fixedly secured thereto an upstanding sleeve 26 in which there is mounted for vertical movement a fluid cylinder 28. The fluid cylinder 28 has a piston rod 30 to which an adapted 32 is secured. The adapter 32 carries a support 34 in the form of a plate. It is to be understood that the sleeve 26 is fixedly mounted relative to the base 24 by suitable means 36.

The support 34, remote from the adapter 32, is provided with an adapter 38 in which there is fixedly mounted a tubular support 40 which is guided in a sleeve member 42 carried by the base 24 for vertical movement together with the support 34. The tubular support 40, in turn, carries a supply unit 46. The supply unit 46 will be described in detail hereinafter.

Figure 3:
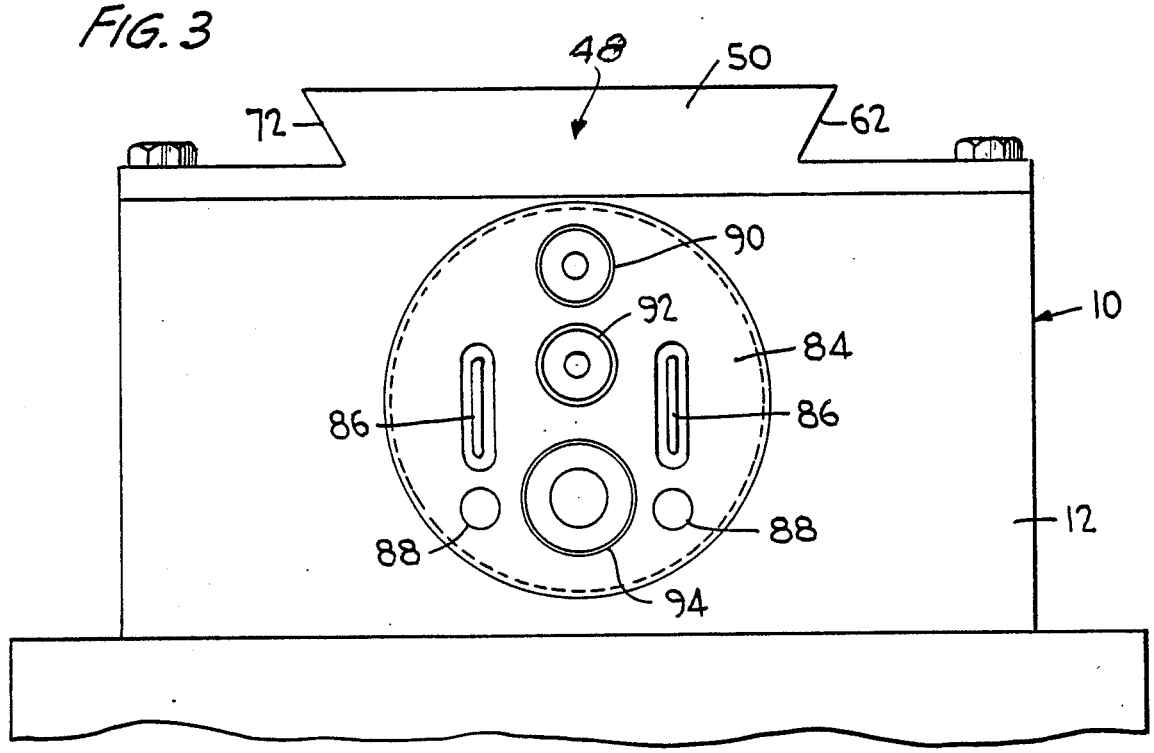
FIG. 3 is an enlarged fragmentary elevational view taken generally along the line 3—3 of FIG. 1 and shows the details of a mounting member carried by the sealing head and plugs carried by the sealing head for connection to the supply unit.

Referring now to FIG. 3, it will be seen that the upper part 12 of the sealing head 10 has secured to the top thereof a mounting member 48 having a dovetailed portion 50 projecting upwardly therefrom. This dovetail portion 50 is utilized to effect the mounting of the sealing head 10 on the support 34.

At this time, with reference to FIG. 1, it is to be noted that the dovetailed portion 50 has a front stop surface 52 and a rear stop surface 54. These surfaces are utilized to position the sealing head 10 longitudinally of the support 34.

Figure 2:
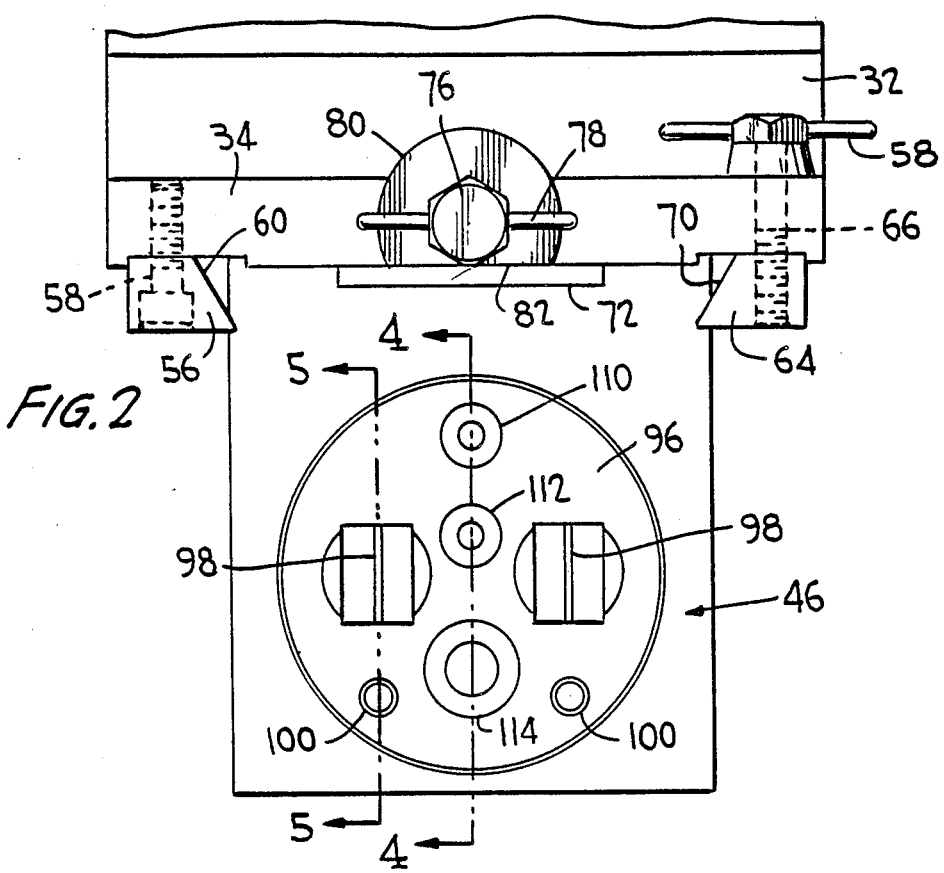
FIG. 2 is an enlarged fragmentary elevational view taken generally along the line 2—2 of FIG. 1 and shows the means for the mounting of the sealing head on the support and the details of the sockets of the supply unit.

With particular reference to FIG. 2, it will be seen that there is generally fixedly secured to the underside of the support 34 a clamp bar 56 by means of fasteners 58. The clamp bar 56 has a sloping clamping surface 60 which is specifically intended to engage a similarly sloping surface 62 of the dovetailed portion 50 as is shown in FIG. 3.

The support 34 also releasably carried a clamp bar 64 by means of a pair of threaded fasteners 66 which are provided with transverse pins 68 to facilitate the manual rotation thereof so as to release the sealing head 10. The clamp bar 64 is provided with a sloping surface 70 which engages a similarly sloping surface 72 of the dovetailed portion 50.

It is to be understood that when the threaded fasteners 66 are tightened, they will operate to tightly clamp the dovetailed portion 50 against the underside of support 34.

With further reference to FIG. 2, it will be seen that the supply unit 46 or part of the support 34 will be provided with a rear stop member 74 which engages the rear stop surface 54 of the dovetailed portion 50 to restrict rear movement of the sealing head 10 relative to the support 34.

Further, in FIG. 2, there is shown that at the illustrated end of the support 34 there is a threaded fastener 76 which is also provided with a transverse pin 78 to facilitate rotation thereof. There is rotatably journaled on the fastener 76 a generally half circular stop member 80 which has an inoperative position wherein a straight edge 82 thereof will be flush with the underside of the support 34 and an operative position where the rounded part of the stop member 80 will project down below the underside of the support 34 and engage the front surface 52 of the dovetailed portion 50 so as to position the sealing head 10 longitudinally of the support 34.

Referring once again to FIG. 3, it will be seen that the rear surface of the upper portion 12 of the sealing head 10 is provided with a mounting block 84 which carries an insulating relation to flat tongs 86 which function as electrical conductors for supplying energy to the induction heating coil 18. Below the prongs 86, mounting block 84 has projecting therefrom two circular prongs or pins 88 which function as electrical conductors for the gas monitor 22.

Positioned along the vertical center line of the mounting block 84 in vertically spaced relation is an upper plug in the form of a conduit 90, an intermediate plug in the form of a conduit 92, and a lower plug in the form of a conduit 94. These conduits project from the mounting block 84 with the conduit 90 intended to receive a vacuum supply for evacuating a container prior to the sealing thereof. The conduit 92 is intended to be supplied with an inert gas for filling the evacuated container with the inert gas. The conduit 94 is intended to receive a vacuum supply for the suction cups or heads 20.

Referring now to FIG. 2, it will be seen that a face of the supply unit 48 is provided with a mounting block 96 which receives in insulated relation receptacles 98 for receiving the blade like prongs 86 in electrically conducting relation. The receptacles 98 may be broadly considered to be sockets.

The mounting head 96 also is provided with tubular electrical receptacles 100 for receiving the prongs or pins 88, the receptacles 100 being considered sockets.

As is best shown in FIG. 5, each receptacle 98 is provided with a connector 102 to which there is connected an electrical lead 104 which will be directed to a high frequency power supply (not shown). In a like manner, each of the sockets 100 is provided with a coupling 106 which connects an electrical lead 108 to the socket 100 with the lead 108 being connected to suitable control mechanisms (not shown).

Further, the mounting head 96 is provided with three vertically aligned sockets 110, 112 and 114 for receiving in gas type relation the prongs 90, 92 and 94 respectively. As is best shown in FIG. 4, the sockets 110, 112 and 114 are provided with suitable sealing rings 116 to form the gas tight seals with the respective prongs or conduits 90, 92 and 94.

The supply unit 46 is provided with suitable internal conduits 118, 120 and 122 to which supply lines 124, 126 and 128 are coupled by means of suitable fittings generally identified by the numerals 130, 132 and 134 respectively. The conduits 118, 120 and 122 are in fluid tight communication with the sockets 110, 112 and 114.

It is to be understood that the clamp bars 56, 64, when the clamp bar 64 is loosely tightened, will serve, in conjunction with the dovetailed portion 50, to automatically align the prongs of the sealing head 10 with the sockets of the supply unit 46 so that automatic coupling of the sealing head 10 with the supply unit 46 is effective when the sealing head 10 is slid into place beneath the support 34.

At this time, with further reference to FIG. 1, it is also pointed out that the cylinder of the fluid motor 28 may be supported within the sleeve 26 by means of an axial extension 136 which carries a cam follower 138 for engagement with a cam track 140. Thus the sealing head 10 may have two separately attained vertical positions in use.

Although only a preferred embodiment of the mounting assembly for the sealing head has been specifically illustrated and described herein, it is to be understood that minor variations may be made in the mounting of the sealing head without departing from the spirit and scope of the invention as defined by the appended claims.

We claim:

1. A quick detach assembly for a sealing head, said assembly comprising a support and supply unit carried by and fixed to and relative to said support, and a sealing head, cooperating first means on said support and said sealing head for releasably mounting said sealing head on said support in alignment with said supply unit, and cooperating second means for releasably coupling said sealing head to said supply unit wherein said cooperating second means includes plug and socket means and said cooperating first means on said sealing head slides on said cooperating means on said support to align said plug means with said socket means.

2. A quick detach assembly for a sealing head, said assembly comprising a support and a supply unit, and a sealing head, cooperating first means on said support and said sealing head for releasably mounting said sealing head on said support, and cooperating second means for releasably coupling said sealing head to said supply unit, said first means including a mounting portion on said sealing head, said mounting portion including a dovetailed part having front and rear stop surfaces, releasable clamp means carried by said support for gripping said dovetailed part, and releasable stop means carried by said support for engaging said front stop surface to position said sealing head on said support, said releasable stop means including a clamp screw carried by said support, a generally half circular clamp element povitally mounted on said clamp screw for swinging between inoperative and stop positions, and said clamp screw forming means for retaining said clamp element in said stop position.

3. An assembly according to claim 5 wherein said releasable clamp means are in the form of clamp bars having sloping clamping surfaces matching surfaces of said dovetailed part.

4. A quick detach assembly for a sealing head, said assembly comprising a support and a supply unit carried by and fixed to and relative to said support, and a sealing head, cooperating first means on said support and said sealing head for releasably mounting said sealing head to said support in alignment with said supply unit, and cooperating second means for separately releasably coupling said sealing head to said supply unit, a base, first mounting means mounting said support on said base for controlled movement relative to said base, second mounting means mounting said supply unit on said base for movement relative to said base, and means coupling together said support and supply unit for movement in unison, said first mounting means include a cam actuated member carrying a fluid cylinder for movement with said member, said fluid cylinder having a piston rod carrying said support, whereby said sealing head may be advanced and retracted by said cam actuated member and separately by said fluid cylinder.

* * * * *